United States Patent Office 2,778,725
Patented Jan. 22, 1957

2,778,725

METHOD FOR MAKING POWDERED VANADIUM METAL

Charles M. Brown, Lewiston, N. Y., assignor to Union Carbide and Carbon Corporation, a corporation of New York No Drawing. Application July 18, 1952,
Serial No. 299,759

8 Claims. (Cl. 75—84)

This invention relates to a new and improved method for producing finely divided vanadium metal. Pure vanadium metal as originally produced is in the form of large lumps and unsuitable for further processing in this state. Vanadium must be melted in an inert atmosphere or vacuum to avoid oxidation. Inert-gas furnaces are relatively small in size and capacity and will not accommodate lumps of massive vanadium. Breaking down these lumps to a size suitable for remelting, or to a powder, however, is quite difficult because of the tough, malleable properties of vanadium. Thus grinding and crushing operations for this metal have been complicated and the results have not been uniform.

Attempts to make metals brittle in order to crush them more easily are not new in the art (Harris, U. S. Patent 1,739,068). However, prior methods have involved the mechanical addition of embrittling agents, the presence of which agents would be undesirable in vanadium, and other methods not suitable for lump vanadium. It is the object of this invention to provide a process for embrittling vanadium so that it may be readily crushed and powdered.

I have discovered that vanadium can be easily and safely rendered brittle enough for crushing and powdering by treating it with hydrogen so as to increase the hydrogen content to within certain specified limits. The metal after such treatment can be readily crushed to the desired fineness by any convenient means, such as jaw or roll crushers, and it can be further powdered in a ball mill. The lump vanadium is rendered sufficiently brittle so that normal crushing equipment can be satisfactorily used. When the vanadium is to be cast into ingots, the heat of remelting removes most of the hydrogen and an ingot is produced which is sufficiently free of hydrogen for most applications. However, the vanadium can be vacuum-annealed before or after melting to further reduce the hydrogen content. Vacuum-annealing is employed to drive off the hydrogen when the vanadium is to be used directly in the crushed state.

Vanadium can be treated with hydrogen to embrittle it by merely heating it in an atmosphere of pure hydrogen for several hours. Ordinary commercial hydrogen, however, contains oxygen and nitrogen as impurities. These gases are also absorbed by the vanadium and are not readily driven off by subsequent heating as is the hydrogen. Therefore in practising this method of the invention it is necessary to use very pure hydrogen and great care must be taken to prevent high absorption of these undesirable gases. The high cost of using chemically pure hydrogen and high degree of care required for the process may render this method undesirable for general application.

I have discovered, however, that vanadium metal can be more easily and safely treated with hydrogen to embrittle it by electrolytic treatment in an acid solution. Massive vanadium is made the cathode in a dilute acid electrolytic bath and a current is passed through it for several hours. By this method, vanadium readily picks up sufficient hydrogen to embrittle it and thus render it amenable to crushing and grinding. Suitable acids include sulphuric acid up to 40% by volume, phosphoric acid up to 5% by volume, and hydrochloric acid up to 1% by volume. The relatively low limit on hydrochloric acid concentration is used because higher concentrations result in the liberation of chlorine gas, which is undesirable.

It has been found that vanadium is satisfactorily embrittled when the hydrogen content is between the limits of 0.01 to 0.50%, while the preferred range of hydrogen content is between 0.10 to 0.15% hydrogen.

The following examples serve to illustrate the invention, but do not limit it:

*Example 1.*—A sample of massive vanadium containing by analysis 0.071% oxygen, 0.0023% hydrogen, and 0.065% nitrogen was heated in an atmosphere of hydrogen for 6 hours at 500° C., after which its analysis was 0.13% oxygen, 0.10% hydrogen and 0.081% nitrogen. It was then vacuum-annealed after crushing and the final analysis was 0.162% oxygen, 0.0016% hydrogen, and 0.082% nitrogen. While there is no increase in hydrogen in the final product by this treatment, the oxygen has increased from 0.071% to 0.162%, or almost two and one-half times as much.

*Example 2.*—A sample of massive vanadium containing by analysis 0.052% oxygen, 0.0018% hydrogen and 0.085% nitrogen was cathodically treated for 12 hours with 18 amperes of current in 10% sulphuric acid, resulting in 0.17% hydrogen being present. After crushing and vacuum-annealing the analysis was 0.088% oxygen, 0.0011% hydrogen and 0.082% nitrogen. By this treatment substantially all hydrogen is removed as before, and there is also practically no increase in percentage of oxygen.

*Example 3.*—A massive vanadium sample containing by analysis 0.077% oxygen, 0.0021% hydrogen, and 0.082% nitrogen was cathodically treated with 18 amperes of current for 16 hours in 10% sulphuric acid, thereby increasing the hydrogen content to 0.29%. After vacuum-annealing the analysis was 0.087% oxygen, 0.0016% hydrogen, and 0.085% nitrogen. In this sample the hydrogen content was greatly increased with only a slight increase in oxygen during the hydrogenation step.

*Example 4.*—A sample of massive vanadium containing by analysis 0.021% oxygen, 0.0014% hydrogen and 0.11% nitrogen was cathodically treated with 1% hydrochloric acid and then crushed, giving the analysis 0.018% oxygen, 0.014% hydrogen and 0.106% nitrogen. The sample was then directly melted in an inert gas furnace and a subsequent analysis of the ingot formed showed 0.029% oxygen, 0.0045% hydrogen and 0.095% nitrogen. This shows that the vacuum-annealing step is not essential where the crushed metal is to be melted, as most of the hydrogen is removed by the melting. This sample was then vacuum-annealed to give the analysis 0.031% oxygen, 0.0021% hydrogen and 0.095% nitrogen. This latter step of vacuum-annealing can be employed where a high degree of freedom from hydrogen is desired in the ingot.

In all of the above examples the vanadium was readily crushed after the hydrogen treatment.

I claim:

1. A process for producing finely divided vanadium metal from massive vanadium comprising making the massive vanadium the cathode in an acidic electrolyte selected from the group consisting of dilute sulphuric, dilute hydrochloric, and dilute phosphoric acids, passing current through the electrolyte until the hydrogen content of the vanadium is increased to between 0.01 and 0.50% hydrogen, whereby the vanadium is made brittle, removing the embrittled massive vanadium from said electrolyte, crushing said embrittled massive vanadium and then vacuum-annealing the crushed vanadium metal, whereby the added hydrogen is removed.

2. A process according to claim 1 wherein said acid electrolyte is dilute sulphuric acid.

3. A process according to claim 1 wherein said acid electrolyte is dilute hydrochloric acid.

4. A process according to claim 1 wherein said acid electrolyte is dilute phosphoric acid.

5. A process for producing from massive vanadium an ingot of vanadium metal amenable to cold-rolling which comprises making a lump of massive vanadium metal the cathode in an acid electrolye selected from the group consisting of dilute sulphuric, dilute hydrochloric, and dilute phosphoric acids, and passing current through the electrolyte, until the hydrogen content of said vanadium is increased by electrolysis to between 0.01 and 0.50% hydrogen, whereby the vanadium is made brittle, removing the embrittled massive vanadium from said electrolyte, crushing said embrittled massive vanadium, melting the crushed vanadium to the molten state in an inert atmosphere, whereby the added hydrogen is driven off, and casting an ingot from the molten vanadium metal.

6. A process according to claim 5 wherein said acid electrolyte is dilute sulphuric acid.

7. A process according to claim 5 wherein said acid electrolyte is dilute hydrochloric acid.

8. A process according to claim 5 wherein said acid electrolyte is dilute phosphoric acid.

References Cited in the file of this patent

UNITED STATES PATENTS

| | | |
|---|---|---|
| Re. 22,452 | Clements et al. | Mar. 7, 1944 |
| 866,385 | Von Pirani | Sept. 17, 1907 |
| 1,089,757 | French | Mar. 10, 1914 |
| 1,513,824 | Kasley | Nov. 4, 1924 |
| 1,663,564 | Rich | Mar. 27, 1928 |
| 1,814,720 | Marden | July 14, 1931 |
| 1,835,024 | Driggs | Dec. 8, 1931 |
| 2,038,402 | Alexander | Apr. 21, 1936 |
| 2,107,277 | Austin | Feb. 8, 1938 |
| 2,107,279 | Balke et al. | Feb. 8, 1938 |
| 2,142,090 | Bercovici | Jan. 3, 1939 |
| 2,204,391 | Allen | June 11, 1940 |
| 2,267,298 | Dean | Dec. 23, 1941 |
| 2,411,524 | Davis | Nov. 26, 1946 |
| 2,584,411 | Alexander | Feb. 5, 1952 |

FOREIGN PATENTS

| | | |
|---|---|---|
| 173,237 | Great Britain | Mar. 21, 1923 |

OTHER REFERENCES

Zeitschrift für anorganische Chemie, vol. 79 (1913), page 217. Article by Prandl et al.